(12) United States Patent
Fowe

(10) Patent No.: US 11,662,746 B2
(45) Date of Patent: May 30, 2023

(54) SYSTEM, METHOD, AND COMPUTER PROGRAM PRODUCT FOR GENERATING MANEUVER DATA FOR A VEHICLE

(71) Applicant: HERE GLOBAL B.V., Eindhoven (NL)

(72) Inventor: James Fowe, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 187 days.

(21) Appl. No.: 16/533,257

(22) Filed: Aug. 6, 2019

(65) Prior Publication Data

US 2021/0041891 A1 Feb. 11, 2021

(51) Int. Cl.
*G05D 1/02* (2020.01)
*G01C 21/36* (2006.01)

(52) U.S. Cl.
CPC ......... *G05D 1/0285* (2013.01); *G01C 21/362* (2013.01); *G01C 21/3658* (2013.01); *G05D 1/0221* (2013.01); *G05D 2201/0213* (2013.01)

(58) Field of Classification Search
CPC .............. G05D 1/0285; G05D 1/0221; G05D 2201/0213; G05D 1/0276; G05D 1/00–12; G01C 21/3658; G01C 21/362; B60W 60/00; G08G 1/163
See application file for complete search history.

(56) References Cited

U.S. PATENT DOCUMENTS

| 9,157,761 B2 | 10/2015 | Levin |
| 2017/0174261 A1 | 6/2017 | Micks et al. |
| 2017/0345292 A1 | 11/2017 | Haran |
| 2018/0251155 A1 | 9/2018 | Chan |
| 2019/0243367 A1* | 8/2019 | Huang ................. H04W 64/00 |
| 2020/0357283 A1* | 11/2020 | Sato ................ G08G 1/096741 |

FOREIGN PATENT DOCUMENTS

DE 102016011367 A1 4/2017

OTHER PUBLICATIONS

Dudley et al., "V2V Communication for Augmenting Reality Enabled Smart HUDs to Increase Situational Awareness of Drivers", Mar. 2018, retrieved from https://yochan-lab.github.io/papers/files/papers/vam-hri-cars.pdf, 7 pages.

* cited by examiner

*Primary Examiner* — Aaron L Troost
(74) *Attorney, Agent, or Firm* — Ditthavong, Steiner & Mlotkowski

(57) ABSTRACT

A system, a method, and a computer program product for generating maneuver data for a vehicle are disclosed herein. The system comprises at least one non-transitory memory configured to store computer program code instructions and at least one processor configured to execute the computer program code instructions to obtain direction share data from at least one mobile device, wherein the direction share data comprises immediate route data and immediate direction data associated with the corresponding at least one mobile device, determine localized direction share data for the at least one mobile device from the direction share data, wherein the localized direction share data indicates location, exact lane and direction of the corresponding at least one mobile device, and generate the maneuver data for the vehicle, based on the localized direction share data and map data, using at least one machine learning model.

13 Claims, 7 Drawing Sheets

| IMMEDIATE ROUTE DATA | IMMEDIATE DIRECTION DATA |

FIG. 5A

| TURN-SIGNAL DATA | GPS DATA | SUDDEN ACCELERATION DATA | HORN DATA | CURRENT SPEED DATA |

FIG. 5B

| LOCATION | EXACT LANE | DIRECTION |

FIG. 6

| LANE LEVEL SPEED PROFILE DATA | LANE LEVEL MANEUVER PATTERN DATA |

FIG. 7

SYSTEM, METHOD, AND COMPUTER PROGRAM PRODUCT FOR GENERATING MANEUVER DATA FOR A VEHICLE

TECHNOLOGICAL FIELD

The present disclosure generally relates to routing and navigation systems, and more particularly relates to generating maneuver data for vehicles to avoid traffic disruptions in a geographical region.

BACKGROUND

Various navigation applications are available to provide directions for driving, walking, or other modes of travel to users. Web sites and mobile applications offer map applications that allow a user to request directions from one point to another. Navigation devices based on Global Positioning System (GPS) technology have become common, and these systems are capable of determining location of a device to provide directions to drivers, pedestrians, cyclists, and the like. On a busy road, when two or more vehicles are driving, drivers of the vehicles may not know routing directions of each other, thereby making navigation in a complex and dynamic road network challenging. Further, in a complex traffic scenario, sudden breaking, turn, lane change, or the like, made by a driver of a vehicle may lead to conflicts, large waiting times, or in some cases accidents among the other vehicles. In some cases, sudden arrival of a pedestrian on a road to cross the road may also lead to accidents. Such situations may make smoother and safer navigation of vehicles challenging.

SUMMARY

Vehicles on a road, typically, rely on map databases that contain information regarding road geometry, lane geometry, road link connectivity, road type, etc. The information in the map databases may be enriched with data sources that provide traffic data, weather related data, and information related to road maintenance. A plurality of sensors, installed onboard the vehicles may provide information related to road objects to augment the content of the map databases or remote map data providers, alert the user of the vehicles of a hazardous condition or even provide input for controlling the vehicle in an autonomous or semi-autonomous manner. Accurate detection of the road objects is essential for navigation of vehicles and providing environmental awareness for vehicle safety has been a primary concern for automobile manufacturers and related service providers. However, a driver of a vehicle can only guess traveling intentions (e.g. intention to change lane, overtake and the like) of drivers of other vehicles on a road. Though, in many instances, drivers of vehicles on a road convey their routing intention through vehicle indicators and the like, sometimes mere conveying of the routing intention through indicators may fail to specify which exact junction a car in front wants to make a turn at a turn signal. Such situations may hinder in safe and smooth navigation.

A system, method, and computer program product are provided in accordance with one or more example embodiments described herein for generating maneuver data for a vehicle.

In one aspect, a system for generating maneuver data for a vehicle is disclosed. The system comprises at least one non-transitory memory configured to store computer program code instructions; and at least one processor configured to execute the computer program code instructions to: obtain direction share data from at least one mobile device, wherein the direction share data comprises immediate route data and immediate direction data associated with the corresponding at least one mobile device, determine localized direction share data for the at least one mobile device from the direction share data, wherein the localized direction share data indicates location, exact lane, and direction of the corresponding at least one mobile device, and generate the maneuver data for the vehicle, based on the localized direction share data and map data, using at least one machine learning model. The machine learning model is trained, based on the map data and secondary localized direction share data, wherein the secondary localized direction share data may correspond to the localization direction share data of a bench test vehicle. The map data comprises lane-level speed profile data and/or lane-level maneuver pattern data. The direction share data further comprises one or more of turn-signal data for lane-level direction and maneuver insight, sudden acceleration data, horn data, GPS data, or current speed data. The maneuver data comprises one or more of lane change data, overtaking data, recommended driving speed data, routing data, estimated time of arrival data, wrong-way direction data, or restricted driving maneuver data.

The processor is further configured to transmit the generated maneuver data to the vehicle. The transmitted maneuver data comprises audio-visual data, wherein the audio-visual data is renderable as at least one of augmented reality or voice alerts. In an embodiment, the processor is further configured to execute lane-level map matching on the direction share data to determine the localized direction share data.

In another aspect, a method for generating maneuver data for a vehicle is disclosed. The method includes obtaining direction share data from the at least one mobile device, wherein the direction share data comprises immediate route data and immediate direction data associated with the corresponding at least one mobile device, determining localized direction share data for the at least one mobile device from the direction share data, wherein the localized direction share data indicates location, exact lane and direction of the corresponding at least one mobile device, and generating the maneuver data for the vehicle, based on the localized direction share data and map data, using at least one machine learning model. The machine learning model is trained, based on the map data and secondary localized direction share data, wherein the secondary localized direction share data may correspond to the localization direction share data of a bench test vehicle. The map data comprises lane-level speed profile data and/or lane-level maneuver pattern data. The direction share data further comprises one or more of turn-signal data for lane-level direction and maneuver insight, sudden acceleration data, horn data, GPS data, or current speed data. The maneuver data comprises one or more of lane change data, overtaking data, recommended driving speed data, routing data, estimated time of arrival data, wrong-way direction data, or restricted driving maneuver data.

The method further includes transmitting of the generated maneuver data to the vehicle. The transmitted maneuver data comprises audio-visual data, wherein the audio-visual data is renderable as at least one of augmented reality or voice alerts. In an embodiment, the method further includes lane-level map matching the direction share data to determine the localized direction share data.

In yet another aspect, a computer programmable product including a non-transitory computer readable medium having stored thereon computer executable instruction which when executed by one or more processors, cause the one or more processors to carry out operations for generating maneuver data for a vehicle, the operations including: obtaining direction share data from the at least one mobile device, wherein the direction share data comprises immediate route data and immediate direction data associated with the corresponding at least one mobile device, determining localized direction share data for the at least one mobile device from the direction share data, wherein the localized direction share data indicates location, exact lane, and direction of the corresponding at least one mobile device, and generating the maneuver data for the vehicle, based on the localized direction share data and map data, using at least one machine learning model. The machine learning model is trained, based on the map data and secondary localized direction share data, wherein the secondary localized direction share data may correspond to the localization direction share data of a bench test vehicle. The map data comprises lane-level speed profile data and/or lane-level maneuver pattern data. The direction share data further comprises one or more of turn-signal data for lane-level direction and maneuver insight, sudden acceleration data, horn data, GPS data, or current speed data. The maneuver data comprises one or more of lane change data, overtaking data, recommended driving speed data, routing data, estimated time of arrival data, wrong-way direction data, or restricted driving maneuver data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
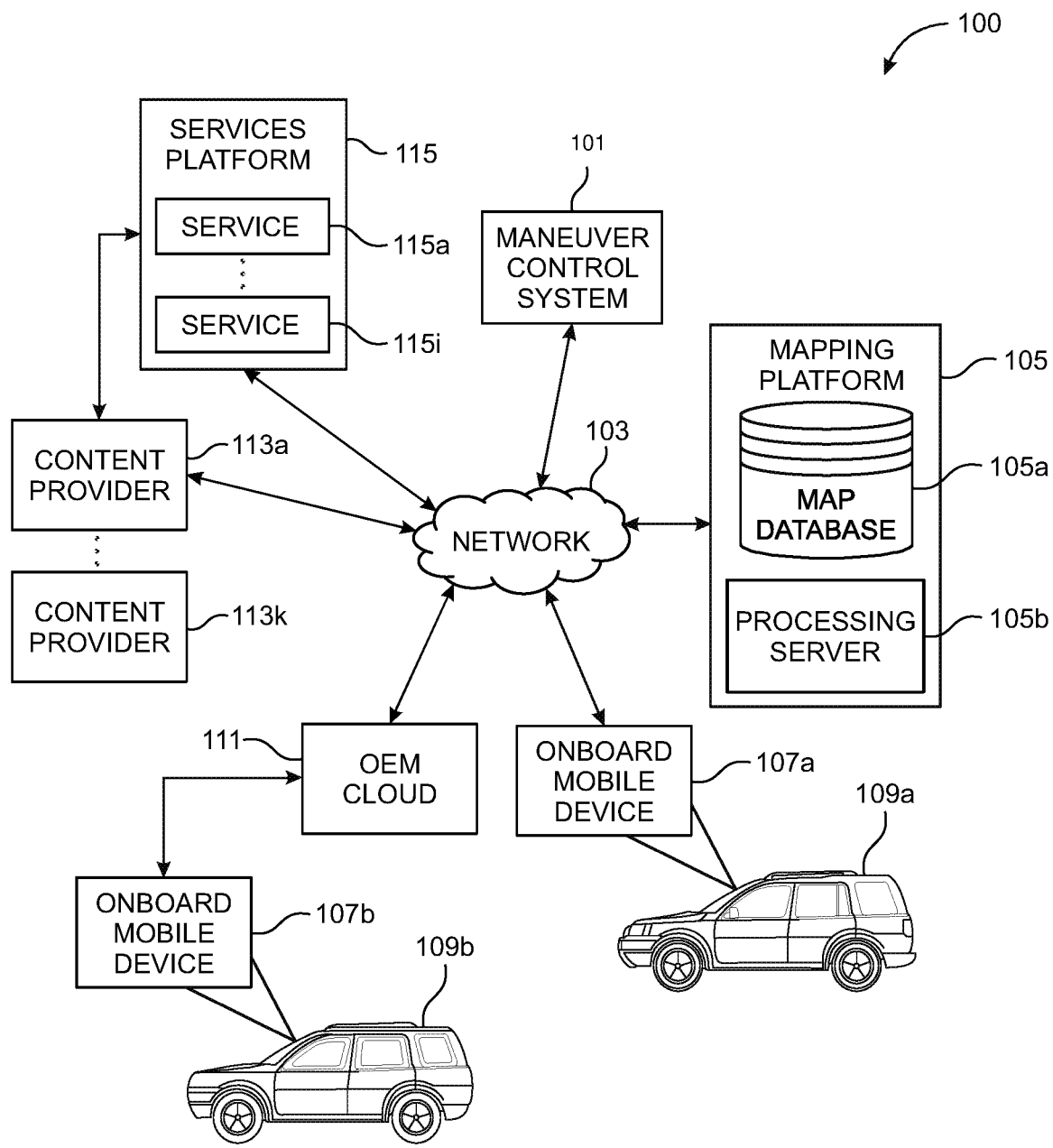
Figure 2:
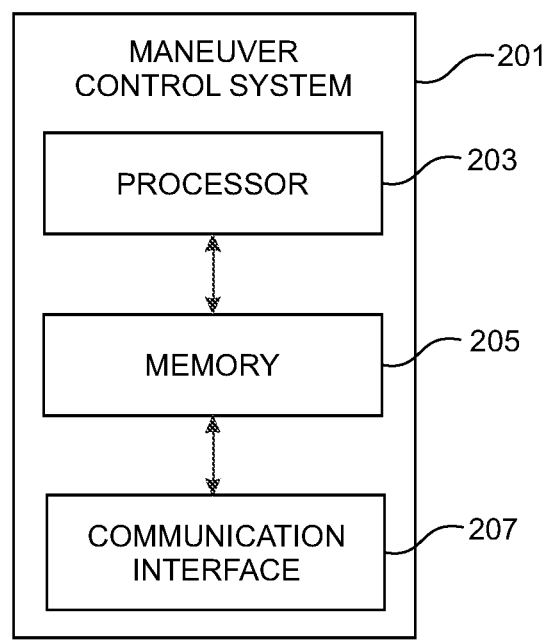
Figure 3:
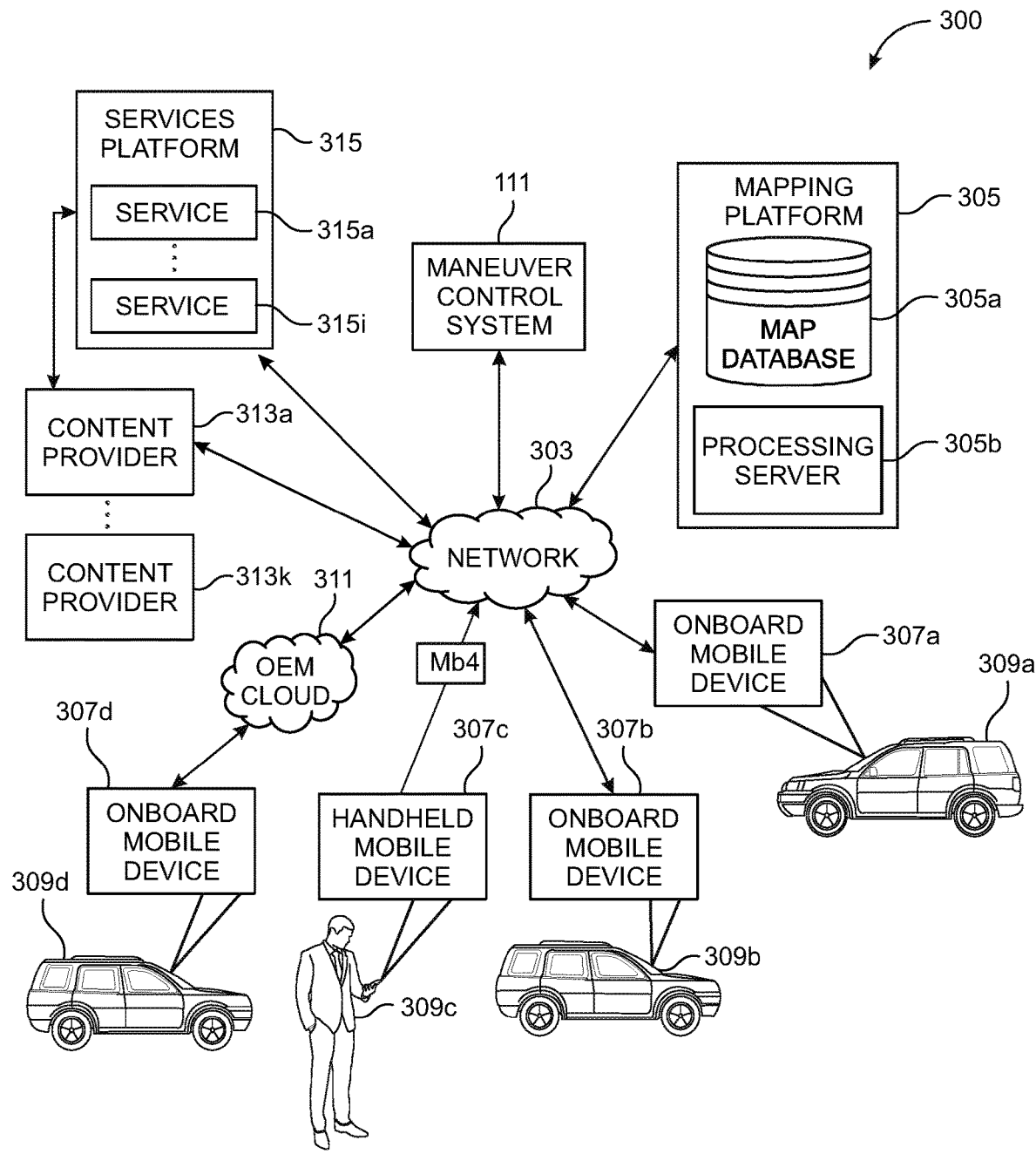
Figure 4:
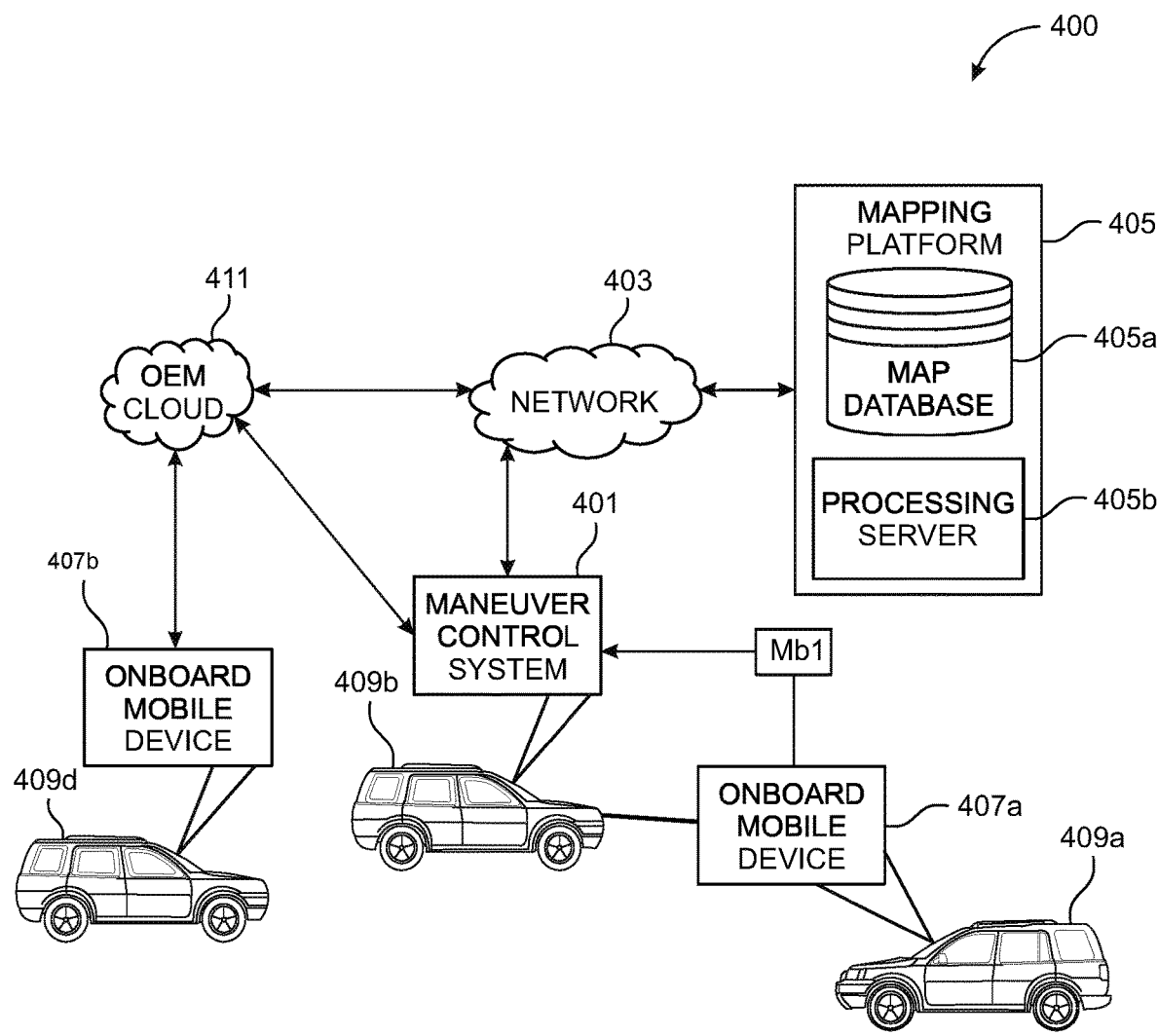
Figure 8:
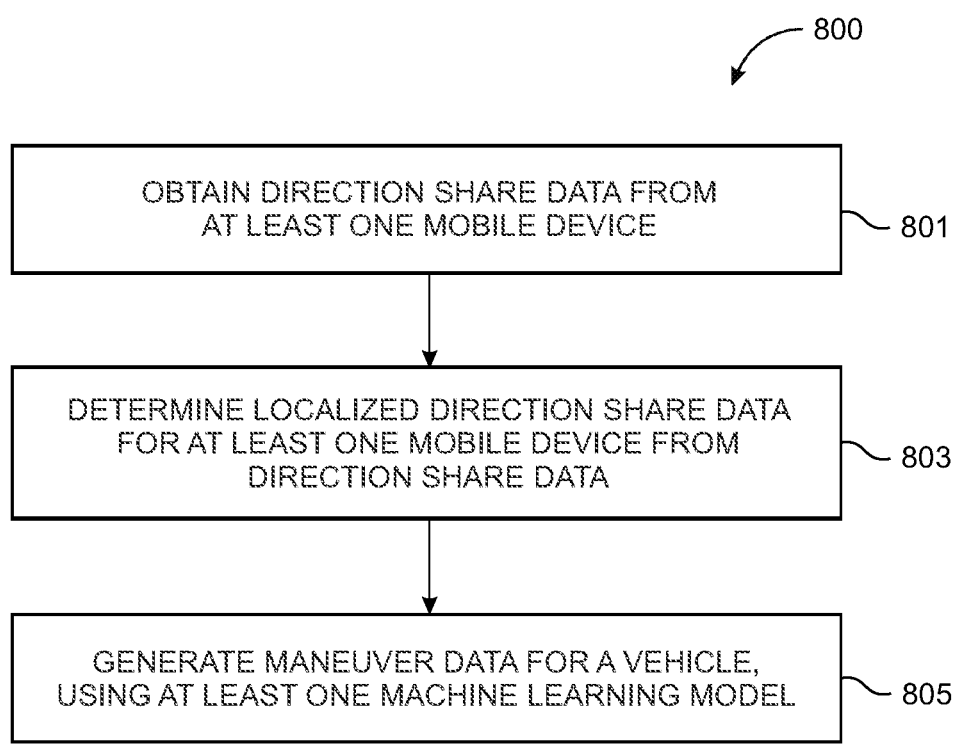
Figure 9:
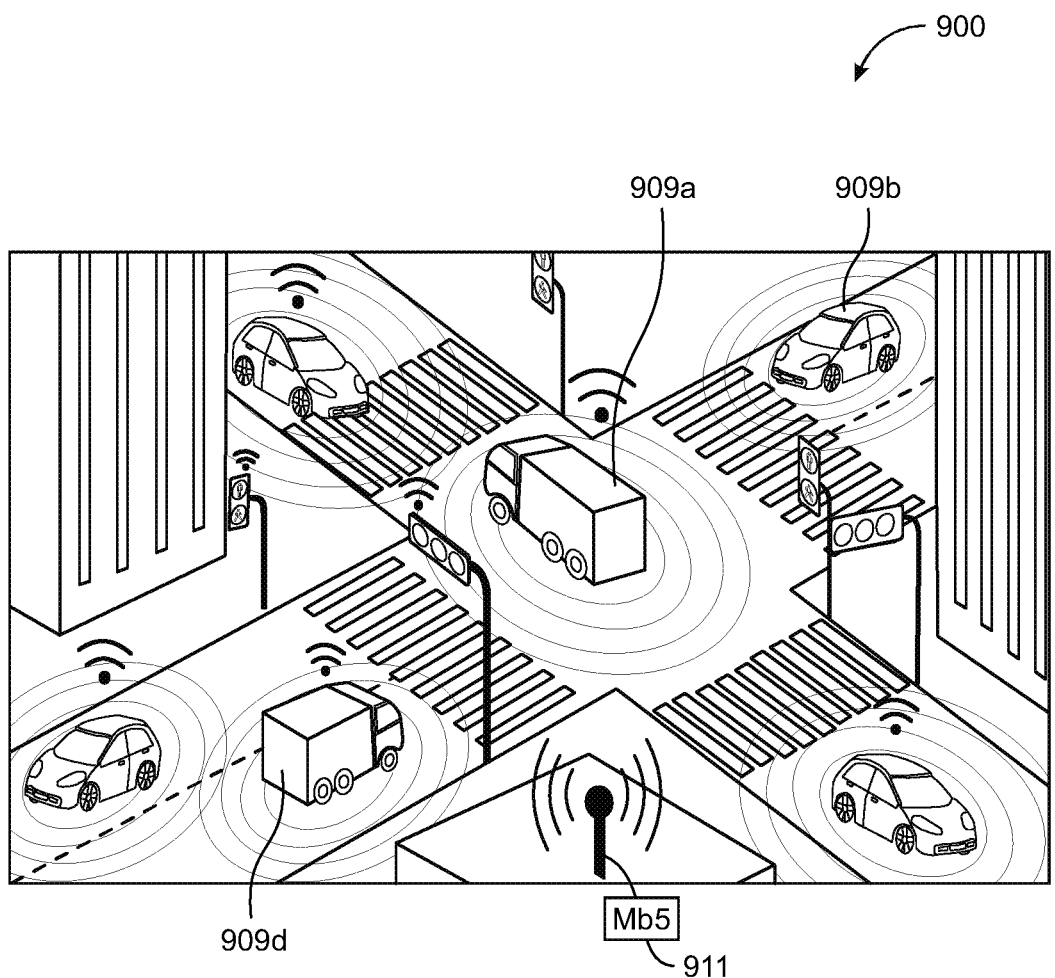

Having thus described example embodiments of the invention in general terms, reference will now be made to the accompanying drawings, which are not necessarily drawn to scale, and wherein:

FIG. 1 illustrates a schematic diagram of an exemplary navigation scenario in which a maneuver control system for generating maneuver data is implemented, in accordance with one or more example embodiments;

FIG. 2 illustrates a block diagram of the maneuver control system for generating maneuver data, in accordance with one or more example embodiments;

FIG. 3 illustrates a schematic diagram of an exemplary working environment of the maneuver control system exemplarily illustrated in FIG. 2, in accordance with one or more example embodiments;

FIG. 4 illustrates a schematic diagram of an alternative exemplary working environment of the maneuver control system exemplarily illustrated in FIG. 2, in accordance with one or more example embodiments;

FIG. 5A illustrates a schematic block diagram depicting data structure of direction share data obtained by the maneuver control system from one or more onboard mobile devices or handheld mobile device, in accordance with one or more example embodiments;

FIG. 5B illustrates a schematic block diagram depicting data structure of direction share data obtained by the maneuver control system from computer vision system, in accordance with one or more example embodiments;

FIG. 6 illustrates a schematic block diagram depicting data structure of localized direction share data determined by the maneuver control system, in accordance with one or more example embodiments;

FIG. 7 illustrates a schematic block diagram depicting data structure of map data used to train machine learning model to generate maneuver data, in accordance with one or more example embodiments;

FIG. 8 illustrates a method for generating maneuver data, in accordance with one or more example embodiments; and FIG. 9 illustrates an exemplary scenario for generating maneuver data for a vehicle by the maneuver control system exemplarily illustrated in FIG. 2, in accordance with one or more example embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present.

This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

A system, method and computer program product are provided herein in accordance with one or more example embodiments for generating maneuver data for a vehicle. In some example embodiments, the system, method, and computer program product provided herein may be used for navigating the vehicle, based on the generated maneuver data to reduce impact of traffic in navigating through a complex road network in a geographical region. The system, method, and computer program product disclosed herein may provide an optimal drive condition, for autonomous, semi-autonomous vehicles and manual vehicles to avoid major traffic disruptions. The system, method, and computer program product disclosed herein may achieve the same by leveraging smart algorithms for dynamic monitoring and optimization of traffic related impact of vehicles.

FIG. 1 illustrates a schematic diagram of an exemplary navigation scenario 100 in which a maneuver control system 101 for generating maneuver data may be implemented, in accordance with one or more example embodiments. In an example embodiment, the maneuver control system 101 may be implemented in a vehicle, where the vehicle may be autonomous, semi-autonomous, or manual vehicle. In an alternate example embodiment, the maneuver control system 101 may be a cloud-based system. Throughout this disclosure, the terms 'maneuver control system' and 'system' may be interchangeably used to mean the maneuver control system 101. The maneuver data generated by the maneuver control system 101 may comprise one or more of lane change data, overtaking data, routing data, recommended driving speed data, estimated time of arrival data, wrong-way direction data, or restricted driving maneuver data. Based on the generated maneuver data, a user of the vehicle may make appropriate decision to drive safely. In an embodiment, the vehicle may change its maneuver, based on the generated maneuver data to drive safely and thereby creating a safer city.

The maneuver control system 101 may be communicatively coupled to an onboard mobile device 107a, through a network 103. In an embodiment, the maneuver control system 101 may communicate with an OEM cloud 111 through the network 103, which in turn may be connected to an onboard mobile device 107b. The onboard mobile devices 107a and 107b may be associated with their corresponding vehicles 109a and 109b respectively. The onboard mobile devices 107a and 107b may be any user accessible device such as a mobile phone, a smartphone, a portable computer, and the like that is portable in itself or as a part of another portable/mobile object such as a vehicle. In some example embodiments, the onboard mobile devices 107a and 107b may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In this context, the user may be an autonomous or semi-autonomous vehicle. The mobile device may comprise processing means such as a central processing unit (CPU), storage means such as onboard read only memory (ROM) and random access memory (RAM), acoustic sensors such as a microphone array, position sensors such as a GPS sensor, orientation sensors such as gyroscope, motion sensors such as accelerometer, a display enabled user interface such as a touch screen display, and other components as may be required for specific functionalities of the. Additional, different, or fewer components may be provided. For example, the onboard mobile devices 107a and 107b may be configured to execute and run mobile applications such as a messaging application, a browser application, a navigation application, and the like.

The network 103 may be wired, wireless, or any combination of wired and wireless communication networks, such as cellular, Wi-Fi, internet, local area networks, or the like. In one embodiment, the network 103 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

The maneuver control system 101 may communicate with the mapping platform 105 via the network 103, where the mapping platform 105 may comprise a map database 105a for storing map data and a processing server 105b. The map database 105a may store node data, road segment data or link data, point of interest (POI) data, posted signs related data or the like. The map database 105a may also include cartographic data and/or routing data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road/link data and the node data may represent a road network, such as used by vehicles, for example, cars, trucks, buses, motorcycles, and/or other entities.

Optionally, the map database 105a may contain path segment and node data records or other data that may represent pedestrian paths or areas in addition to or instead of the vehicle road record data, for example. The road/link segments and nodes may be associated with attributes, such as geographic coordinates, street names, address ranges, lane-level speed profile (historically derived speed limits for a lane), lane-level maneuver pattern (lane change patterns at intersections), and other navigation related attributes, as well as POIs, such as fueling stations, hotels, restaurants, museums, stadiums, offices, auto repair shops, buildings, stores, parks, etc. The map database 105a may include data about the POIs and their respective locations in the POI records. The map database 105a may additionally include data about places, such as cities, towns, or other communities, and other geographic features such as bodies of water, mountain ranges, etc. Such place or feature data may be part of the POI data or may be associated with POIs or POI data records (such as a data point used for displaying or representing a position of a city). In addition, the map database 105a may include event data (e.g., traffic incidents, construction activities, scheduled events, unscheduled events, etc.) associated with the POI data records or other records of the map database 105a. The map database 105a may additionally include data related to road signs and last mile connectivity information from different locations in a geographical region.

The processing server 105b may comprise processing means and communication means. For example, the processing means may comprise one or more processors configured to process requests received from the maneuver control system 101. The processing means may fetch map data from the map database 105a and transmit the same to the maneuver control system 101 in a format suitable for use by the maneuver control system 101. In one or more example embodiments, the mapping platform 105 may periodically communicate with the maneuver control system 101 via the processing means to update a local cache of the map data stored on the maneuver control system 101. Accordingly, in some example embodiments, the map data may also be stored on the maneuver control system 101 and may be updated based on periodic communication with the mapping platform 105.

The map database 105a may be maintained by a content provider 113a-113k e.g., a map developer. By way of example, the map developer may collect geographic data to generate and enhance the map database 105a. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Also, remote sensing, such as aerial or satellite photography, may be used to generate map geometries directly or through machine learning.

The services platform 115 may comprise other third-party services 115a-115i and may include mapping services, navigation services, travel planning services, notification services, social networking services, content (e.g., audio, video, images, etc.) provisioning services, application services, storage services, contextual information determination services, location based services, information based services (e.g., weather, news, etc.), etc.

FIG. 2 illustrates a block diagram of the maneuver control system 201 for generating maneuver data, in accordance with one or more example embodiments of the present invention. The maneuver control system 201 may include a processing means such as at least one processor 203, storage means such as at least one memory 205, and a communication means such as at least one communication interface 207. The processor 203 may retrieve computer program code instructions that may be stored in the memory 205 for execution of the computer program code instructions.

The processor 203 may be embodied in a number of different ways. For example, the processor 203 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 203 may include one or more processing cores configured to perform independently. A multi-core processor may enable multiprocessing within a single physical package. Additionally or alternatively, the processor 203 may include one or more processors configured in tandem via the bus to enable independent execution of instructions, pipelining and/or multithreading.

Additionally or alternatively, the processor 203 may include one or more processors capable of processing large volumes of workloads and operations to provide support for big data analysis. In an example embodiment, the processor 203 may be in communication with a memory 205 via a bus for passing information among components of structure 100. The memory 205 may be non-transitory and may include, for example, one or more volatile and/or non-volatile memories. In other words, for example, the memory 205 may be an electronic storage device (for example, a computer readable storage medium) comprising gates configured to store data (for example, bits) that may be retrievable by a machine (for example, a computing device like the processor 203). The memory 205 may be configured to store information, data, content, applications, instructions, or the like, for enabling the apparatus to carry out various functions in accordance with an example embodiment of the present invention. For example, the memory 205 may be configured to buffer input data for processing by the processor 203. As exemplarily illustrated in FIG. 2, the memory 205 may be configured to store instructions for execution by the processor 203. As such, whether configured by hardware or software methods, or by a combination thereof, the processor 203 may represent an entity (for example, physically embodied in circuitry) capable of performing operations according to an embodiment of the present invention while configured accordingly. Thus, for example, when the processor 203 is embodied as an ASIC, FPGA or the like, the processor 203 may be specifically configured hardware for conducting the operations described herein. Alternatively, as another example, when the processor 203 is embodied as an executor of software instructions, the instructions may specifically configure the processor 203 to perform the algorithms and/or operations described herein when the instructions are executed. However, in some cases, the processor 203 may be a processor specific device (for example, a mobile terminal or a fixed computing device) configured to employ an embodiment of the present invention by further configuration of the processor 203 by instructions for performing the algorithms and/or operations described herein. The processor 203 may include, among other things, a clock, an arithmetic logic unit (ALU) and logic gates configured to support operation of the processor 203.

In some embodiments, the processor 203 may be configured to provide Internet-of-Things (IoT) related capabilities to users of the maneuver control system 201, where the users may be a traveler, a rider, a pedestrian, and the like. In some embodiments, the users may be or correspond to an autonomous or semi-autonomous vehicle. The IoT related capabilities may in turn be used to provide smart navigation solutions by providing real time updates to the users to take pro-active decision on turn-maneuvers, lane changes, overtaking, merging and the like, big data analysis, and sensor-based data collection by using the cloud based mapping system for providing navigation recommendation services to the users. The maneuver control system 201 may be accessed using the communication interface 207. The communication interface 207 may provide an interface for accessing various features and data stored in the maneuver control system 201.

FIG. 3 illustrates a schematic diagram of an exemplary working environment 300 of a maneuver control system 301 exemplarily illustrated in FIG. 2. In an embodiment, the maneuver control system 301 may be implemented in a cloud 317. The cloud 317 may be implemented as a backend server which may be remotely located. The maneuver control system 301 may be communicatively coupled to one or more onboard mobile devices 307a, 307b, 307d, or handheld mobile device 307c via the network 303. The onboard mobile devices 307a, 307b, and 307d may each be installed in vehicles 309a, 309b, and 309d, respectively, where the vehicles 309a, 309b, and 309d may be autonomous vehicles, semi-autonomous vehicles, or manual vehicles. The handheld mobile device 307c may be held by a pedestrian 309c, where the handheld device may correspond to smartphones, netbooks, personal digital assistants, devices in an Internet of things (IoT) environment and the like as described in detail description of FIG. 1. The onboard mobile devices 307a, 307b, and 307d may comprise a separate direction share application, where the direction share application may be provided with an option to enable direction share. In some example embodiments, each of the onboard mobile devices 307a, 307b, and 307d may share direction share data with the maneuver control system 301, only when the direction share is enabled.

The handheld mobile device 307c may also comprise the separate direction share application. The direction share application of the handheld device 307c may be provided with one or more predictive algorithms to predict direction share data of the pedestrian 309c. The direction share application of the handheld device 307c may share the direction share data with the maneuver control system 301, through the network 303. The direction share data associated with each of the onboard mobile devices 307a, 307b, 307d, and the handheld mobile device 307c may primarily comprise immediate route data and immediate direction data of the corresponding vehicles 309a, 309b, 309d, and the corresponding pedestrian 309c respectively. Additionally, the direction share data may comprise turn-signal data for lane-level direction and maneuver insight, sudden acceleration data or deceleration data (i.e. jerk), horn data, GPS data, or current speed data generated by computer vision system installed in each of the vehicles 309a, 309b and 309d. The computer vision system in each of the vehicles 309a, 309b and 309d may capture information regarding route direction of vehicles moving in immediate routes of each of the vehicles 309a, 309b and 309d in an image format or video format to generate the direction share data.

The maneuver control system 301 may be configured to obtain the direction share data directly from each of the onboard mobile devices 307a and 307b through the network 303. In an embodiment, the maneuver control system 301 may be configured to obtain the direction share data from an OEM cloud 311 through the network 303. The OEM cloud 311 may be connected to the onboard mobile device 307d. The onboard devices 307a, 307b, and 307d may be implemented in autonomous vehicles, semi-autonomous vehicles, or manual vehicles. In an embodiment, the maneuver control system 301 may be configured to obtain the direction share data from the handheld devices 307c through the network 303.

The maneuver control system 301 may communicate with the mapping platform 305 through the network 303. The maneuver control system 301 may obtain map data for the direction share data obtained from each of the vehicles 309a, 309b, and 309d and the pedestrian 309c. The map data may comprise lane-level details of the direction share data. The lane-level details may be lanes in a particular road and the like. The maneuver control system 301 may be configured to run algorithms, the algorithms may map match the obtained map data on the obtained direction share data to determine localized direction share data. In an example embodiment, the algorithms may comprise lane-level map matching algorithms and the like. The localized direction share data may comprise location, exact lane, direction and the like corresponding to each of the onboard mobile devices 307a, 307b, 307d, and the handheld mobile device 307c.

The maneuver control system 301 may obtain the map data for the localized direction share data from the mapping platform 305 through the network 303. The map data of the localized direction share data may comprise lane-level speed profile, lane-level maneuver pattern, road network graph, and the like. The lane-level speed profile may comprise historically derived classification of speeds typical for a lane, which may be used to know possible change in speeds by the vehicles 309a, 309b, and 309d within next few seconds in real-time. The lane-level maneuver pattern may be used to understand lane change patterns in different road segment. The road network graph may comprise lane-level details such as lanes in a particular road and the like. The maneuver control system 301 may be configured to generate maneuver data using at least one machine learning model. In an example embodiment, the machine learning model may be trained using secondary localized direction share data and map data. The secondary localized direction share data may correspond to the localized direction share data of a bench test vehicle. In an example embodiment, the machine learning model may compile the obtained map data of the localized direction share on the determined localized direction share data of each of the vehicles 309a, 309b and 309d to run physics simulations to generate the maneuver data. In an embodiment, the maneuver control system 301 may be configured to transmit the generated maneuver data to one or more of the onboard mobile devices 307a, 307b and 307d through the network 303. In an example embodiment, the system 301 may transmit the generated maneuver data as an audio-visual data. The audio-visual data may be provided to a user of the vehicle (e.g. one of 309*a*, 309*b* and 309*d*) through augmented reality and/or voice alerts.

In an example embodiment, the augmented reality application may be installed in one or more of the onboard mobile devices 307*a*, 307*b*, and 307*d*. In one or more example embodiments, the users of the vehicles 309*a*, 309*b* and 309*d* may be provided with a pair of glasses embedding Augmented Reality (AR) technology. Each of the onboard mobile device 307*a*, 307*b* and 307*d* may comprise an executable AR application. On receiving the generated maneuver data from the system 301, the AR application may be configured to display objects (car, pedestrian etc.), in front of each of the vehicles 309*a*, 309*b*, 309*d* in a display device embedded in the pair of glasses. The user of each of the vehicles 309*a*, 309*b* and 309*d* may wear the pair of glasses and, may see pointed lines and arrows in front of the objects. The user of each of the vehicles 309*a*, 309*b*, 309*d* may drive with an understanding of where the objects are headed and use this decision to drive safely. In an example embodiment, the objects may be other vehicles except the vehicle the user is driving and pedestrians within the threshold distance. Additionally, the generated maneuver data may be presented to the user of each of the vehicles 309*a*, 309*b* and 309*d* as voice alerts through speaker and the like. In an embodiment, the generated maneuver data may be used as a control signal to change the maneuver of the vehicles 309*a*, 309*b*, and 309*d*. All user experiences which fall within the scope of the invention may be contemplated for the purpose of this invention.

The working environment 300 may further include a services platform 315 and content provider 313*a*-313*k*. The mapping platform 305 may communicate with the services platform 315 and the content provider 313*a*-313*k* through the network 303. The content provider 313*a*-313*k* may be used to maintain the map database 105*a* 305*a* as described in detail description of FIG. 1. The services provider 315 may provide services as described in detail description of FIG. 1.

FIG. 4 illustrates a schematic diagram of an alternative exemplary working environment of the maneuver control system exemplarily illustrated in FIG. 2, in accordance with one or more example embodiments of the present invention. The maneuver control system 401 may be installed in a vehicle 409*b*. In an embodiment, the maneuver control system 401 may be a part of an onboard mobile device 407*b* installed in the vehicle 409*b*. The maneuver control system 401 may be communicatively coupled to an onboard mobile device 407*a*. In an embodiment, the maneuver control system 401 may be communicatively coupled to an onboard mobile device 407*d* via OEM cloud. The onboard mobile devices 407*a* and 407*d* may be installed in vehicles 409*a* and 409*d*, where the vehicles 409*a*, 409*b*, and 409*d* may be autonomous vehicles, semi-autonomous vehicles, manual vehicles, or combination of these vehicles. The onboard mobile devices 407*a*, 407*b*, and 407*d* may comprise a separate direction share application, where the direction share application may be provided with an option to enable direction share. Each of the onboard mobile devices 407*a*, 407*b*, and 407*d* may share direction share data among each other within a threshold distance in upstream and downstream of each vehicle, only when the direction share is enabled. In one or more example embodiments, the threshold distance may include a few meters in upstream and in downstream of each of the vehicles 309*a*, 309*b*, 309*d*. In one or more alternative or additional example embodiments, the threshold distance may include a radial distance from each of the vehicles 309*a*, 309*b*, 309*d*. The direction share data of the onboard mobile devices 407*a*, 407*b*, and 407*d* may primarily comprise immediate route data and immediate direction data of the corresponding vehicles 409*a* and 409*d*.

The maneuver control system 401 may be configured to obtain the direction share data directly from the each of onboard mobile devices 407*a* and 407*b*. In an embodiment, the maneuver control system 401 may be configured to obtain the direction share data via an OEM cloud 411. The OEM cloud 411 may be connected to the onboard mobile device 407*d*. Additionally, the maneuver control system 401 may be configured to obtain the direction share data from one or more computer vision systems installed or communicatively coupled to the vehicle 409*b*. The direction share data obtained from the one or more computer vision systems may comprise one or more of turn-signal data for lane-level direction and maneuver insight, sudden acceleration data or deceleration data (i.e. jerk), horn data, GPS data, or current speed data of immediate vehicles. In an example embodiment, the computer vision system may be a part of the maneuver control system 401. The computer vision system in the vehicle 409*b* may capture information regarding route direction of the vehicle 409*b* moving in immediate route of the vehicle 409*b* in an image format or video format to generate the direction share data. In an embodiment, the maneuver control system 401 may be configured to obtain the direction share data from handheld device of a pedestrian.

The maneuver control system 401 may communicate with the mapping platform 405 through the network 403. The maneuver control system 401 may obtain map data for the direction share data obtained from each of the onboard mobile devices 407*a*, 407*b*, and 407*d*. The map data for the direction share data may comprise lane-level details of the direction share data. The lane-level details may be lanes in a particular road and the like. The maneuver control system 401 may be configured to run algorithms, the algorithms may map match the obtained map data for the direction share data on the obtained direction share to determine localized direction share data. In an example embodiment, the algorithms may comprise lane-level map matching or the like. The localized direction share data may comprise location, exact lane, direction and the like corresponding to each of the onboard mobile devices 407*a*, 407*b*, and 407*d*.

The maneuver control system 401 may obtain the map data for the localized direction share data from the mapping platform 405 through the network 303. The map data of the localized direction share data may comprise lane-level speed profile, lane-level maneuver pattern, road network graph, and the like. The lane-level speed profile may comprise historically derived classification of speeds typical for a lane, which may be used to know possible change in speeds by the vehicles 409*a* and 409*d* within next few seconds in real-time. The lane-level maneuver pattern may be used to understand lane change patterns in different road segment. The road network graph may comprise lane-level details such as lanes in a particular road and the like. The maneuver control system 401 may be configured to generate maneuver data using at least one machine learning model. In an example embodiment, the machine learning model may be trained using secondary localized direction share data and map data. The secondary localized direction share data may correspond to the localized direction share data of a bench test vehicle. In an example embodiment, the machine learning model may compile the obtained map data of the localized direction share on the determined localized direction share data of each of the onboard mobile devices 407*a*, 407*b*, and 407*d* to run physics simulations to generate the maneuver data.

In an embodiment, the maneuver control system 401 may be configured to transmit the generated maneuver data to onboard mobile device 407*b*. For example, the maneuver control system 401 may transmit the generated maneuver data as an audio-visual data. The audio-visual data may be provided to a user of the vehicle 409*b* through augmented reality and/or voice alerts. In an example embodiment, the augmented reality application may be installed in the onboard mobile devices 407*b*. In one or more example embodiments, the user of the vehicles 409*b* may be provided with a pair of glasses embedding Augmented Reality (AR) technology. The onboard mobile device 407*b* may comprise an executable AR application. On receiving the generated maneuver data from the system 401, the AR application may be configured to display objects (car, pedestrian etc.), in front of the vehicles 409*b* in a display device embedded in the pair of glasses. The user of the vehicles 409*b* may wear the pair of glasses and, may see pointed lines and arrows in front of the objects. The user of the vehicles 409*b* may drive with an understanding of where the objects are headed and use this decision to drive safely. In an example embodiment, the objects may be other vehicles except the vehicle the user is driving and pedestrians within the threshold distance. Additionally, the generated maneuver data may be presented to the user of the vehicles 309*b* as voice alerts through speaker and the like. In an embodiment, the generated maneuver data may be used as a control signal to change the maneuver of the vehicle 409*b*. All user experiences which fall within the scope of the invention may be contemplated for the purpose of this invention.

FIG. 5A illustrates a schematic block diagram depicting data structure of direction share data obtained by the maneuver control system from one or more onboard mobile devices or handheld mobile device, in accordance with one or more example embodiments of the present invention. The direction share data may comprise immediate route data and immediate direction data of vehicles and pedestrians. The immediate route data and the immediate direction data of the vehicles (e.g. 309*a*, 309*b*, 309*d*) may be provided by users of the vehicles (e.g. 309*a*, 309*b*, 309*d*). The immediate route data of each of the vehicles (e.g. 309*a*, 309*b*, 309*d*) may be inferred as next path taken by each of the vehicles 309*a*, 309*b*, 309*d* and the pedestrian. The immediate direction data of each of vehicles (e.g. 309*a*, 309*b*, 309*d*) may be inferred as next series of moves made by each of the vehicles 309*a*, 309*b*, 309*d* and the pedestrian. The onboard mobile devices or handheld mobile devices, which in turn shares the direction share data as discussed in detail description of FIG. 4.

FIG. 5B illustrates a schematic block diagram depicting data structure of direction share data obtained by the maneuver control system from computer vision system, in accordance with one or more example embodiments of the present invention. The direction share data may comprise turn-signal data for lane-level direction and maneuver insight, sudden acceleration data or deceleration data (i.e. jerk), horn data, GPS data, or current speed data of vehicles. The turn-signal data may be inferred as a turn indication (indicators and the like) made by immediate vehicles. The immediate vehicles may be vehicles within the threshold distance of a vehicle in which the computer vision system is installed. The horn data may be inferred as a sound indication (horn and the like) made by the immediate vehicles. The acceleration data may be a change in velocity of the vehicle in which the computer vision system is installed. The GPS data may be inferred as an exact location of the vehicle in which the computer vision system is installed. The current speed data may be inferred as a speed of the vehicle in runtime. The computer vision system may be present in a vehicle (e.g. 409*b*) which may be configured to capture images or videos regarding route direction of the immediate vehicles moving in immediate routes, based on which the system 201 may generate maneuver.

FIG. 6 illustrates a schematic block diagram depicting data structure of localized direction share data determined by maneuver control system 401. The maneuver control system 401 may run algorithms such as lane-level map matching on obtained direction share data to determine the localized direction share data of vehicles from which the direction share data was obtained. The localized direction share data may comprise location, exact lane, and direction of the vehicles from which the direction share data was obtained. The exact lane may be inferred as, which lane on a road the vehicle is present. The direction may be inferred as, in which direction the vehicle is heading.

FIG. 7 illustrates a schematic block diagram depicting data structure of map data used to train a machine learning model to generate maneuver data. The maneuver control system 401 may generate maneuver data using the machine learning model. The machine learning model may be trained in advance with the map data and secondary localized direction share data, where the map data may be obtained from the map database 405*a*. The secondary localized direction share data may correspond to the localized direction share data of a bench test vehicle. The map data may comprise lane-level speed profile data, lane-level maneuver pattern data, and the like. The lane-level speed profile data may be historically derived classification of speeds typical for a lane, which may be used to know the possible change in speeds of vehicles in the lane in real-time. The lane-level maneuver pattern data may be used to understand lane change patterns in different road segment.

FIG. 8 illustrates a method 800 for generating maneuver data, in accordance with an example embodiment. It will be understood that each block of the flow diagram of the method 800 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 205 of the maneuver control system 201, employing an embodiment of the present invention and executed by a processor 203. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 800 illustrated by the flowchart diagram of FIG. 8 for generating the maneuver data for the vehicle 409b may include, at step 801, obtaining direction share data from the onboard mobile devices 407a and 407d. The method 800, at step 803, may include determining localized direction share data for the vehicles 409a and 409d from the obtained direction share data. At step 805, the method 800 may include generating the maneuver data for the vehicle 409b, based on the determined localized direction share data and map data, using at least one machine learning model.

Additionally, the method 800 may include various other steps not shown in FIG. 8. For example, the method 800 may further include transmitting of the generated maneuver data to a vehicle (such as 409b). The generated maneuver data may be transmitted as audio-visual data, which in turn may be presented to a user of the vehicle through augmented reality and/or voice alerts. Furthermore, determining of localization direction share data for each of the vehicles (409a, 409b and 409d) may comprise lane-level map matching the direction share data obtained from each of the onboard mobile device (407a, 407b, and 407d). Furthermore, the machine learning model may be trained using secondary direction share data and map data. The secondary direction share data may correspond to the localization direction share data of a bench test vehicle. The map data may comprise lane-level speed profile data and lane-level maneuver pattern data and the like. Furthermore, the direction share data may comprise turn-signal data for lane-level direction and maneuver insight, sudden acceleration data, horn data, GPS data, and current speed data and the like. Furthermore, the maneuver data may comprise lane change data, overtaking data, recommended driving speed data, routing data, estimated time of arrival data, wrong-way direction data, or restricted driving maneuver data.

In an example embodiment, a system for performing the method of FIG. 8 above may comprise a processor (e.g. the processor 203) configured to perform some or each of the operations (801-805) described above. The processor may, for example, be configured to perform the operations (801-805) by performing hardware implemented logical functions, executing stored instructions, or executing algorithms for performing each of the operations. Alternatively, the system may comprise means for performing each of the operations described above. In this regard, according to an example embodiment, examples of means for performing operations 801-807 may comprise, for example, the processor 203 and/or a device or circuit for executing instructions or executing an algorithm for processing information as described above.

On implementing the method 800 disclosed herein, the end result of the maneuver control system 401 may lead to generation of the maneuver data for a vehicle (e.g. 409b). The maneuver control system 401 may be capable of assessing probable conflicts with the vehicle 409b during lane change, overtaking, sudden acceleration or deceleration, turns and the like. The maneuver control system 401 may also be capable of assessing probable conflicts at an intersection. In an example, the intersection may be an intersection with traffic signal or without traffic signal. Such as seamless generation of maneuver data may aid in smooth operation of the vehicles on the roads. As such, the invention assists in implementing smart traffic solutions and may form a basis for future of smart city solutions.

FIG. 9 illustrates an exemplary scenario 900 for generating maneuver data for a vehicle 909b by the system exemplarily illustrated in FIG. 2.

The scenario 900 shows a complex intersection, where each of vehicles in the intersection may take different routes to reach their destinations. In such cases the vehicles need to wait for long time to move, as the vehicles do not know the route and direction of other vehicles in the intersections. For example, the vehicle 909b may take a right turn, a vehicle 909a may proceed straight, and a vehicle 909d may take left turn. The vehicles 909a, 909b, and 909d may be autonomous, semi-autonomous, manual or combination of these vehicles. In this case the vehicle 909b should wait until the vehicle 909a cross the intersection, the vehicle 909b should wait until the vehicle 909d takes left, if the vehicle 909d is a fast moving vehicle. The sudden moves by the vehicle 909b without regards to the above consideration may lead to conflicts. Accordingly, if the vehicles 909a, 909b and 909d share their direction share data to the maneuver control system 201, the maneuver control system 201 may generate the maneuver data for the vehicle 909b. Considering exemplarily that the maneuver control system 201 may be in the cloud 317, as described with reference to FIG. 3, the maneuver control system 201 may obtain the direction share data from the vehicles 909a, 909b, and 909d as explained in detail description of FIG. 3. On obtaining the direction share data, the maneuver control system 201 to generate the maneuver data need to be configured to determine the localized direction share. Accordingly, if the maneuver control system 201 is configured to determine localization direction share data, then the maneuver control system may be provided with the localized direction share data of vehicles 909a, 909b, and 909d. The localized direction share data may comprise location, exact lane and direction of each of the vehicles 909a, 909b, and 909d. The maneuver control system 301 may determine the localized direction share data for each of the vehicles 909a, 909b, 909d from the direction share data as described in detail description of FIG. 3.

On determining the localized direction share data the maneuver control system 201 may be configured to generate maneuver data. The generated maneuver data may comprise the drive speed recommendation for the vehicle 909b, the estimated time of arrival of the vehicles 909a and 909d, thereby the vehicle 909b no need to wait time for longer period. The maneuver control system 201 may be configured to generate the maneuver data for the vehicle 909b as described in the detail description of FIG. 3. In an embodiment, the maneuver control system 201 may present the generated maneuver data to a user of the vehicle 909b, through a pair of glasses embedding augmented reality and/or through voice alerts sounded by an audio device. In an example embodiment, where the vehicle 909b is an autonomous vehicle, the maneuver data generated by maneuver control system may be control signals. The control signals may change a maneuver of the vehicle 909b.

Alternately, the maneuver control system 201 may be installed in the vehicle 909b to generate maneuver data for the vehicle 909b. The maneuver control system 201 may be configured to obtain direction share data from the vehicles

409a and 409d. In an example embodiment, the maneuver control system 201 may obtain the direction share data from the server 911. The server 911 may be a base station and the like. The server may obtain the direction share data from far located vehicles (away from a threshold distance of the vehicle 909b) and transmit the obtained direction share data to the vehicle 909b. The maneuver control system 201 may generate the maneuver data from the obtained direction share as described in the detailed description of FIG. 4.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

I claim:

1. A system for generating maneuver data for a vehicle, the system comprising:
    at least a memory configured to store computer-executable instructions; and
    one or more processors configured in a base station or a mobile device to execute the instructions to:
    obtain direction share data from at least one other mobile device, wherein the direction share data comprises immediate route data and immediate direction data associated with the corresponding at least one other mobile device;
    determine localized direction share data for the at least one other mobile device from the direction share data, wherein the localized direction share data indicates location, exact lane and direction of the corresponding at least one other mobile device;
    generate the maneuver data for the vehicle using at least one machine learning model to run physics simulations based on the localized direction share data and map data, wherein the maneuver data comprises at least one control signal that changes a maneuver of the vehicle; and
    transmit, over a network, the generated maneuver data to the at least one other mobile device residing on the vehicle,
    wherein the at least one machine learning model is trained, based on the map data and secondary localized direction share data, wherein the secondary localized direction share data corresponds to localization direction share data of a bench test vehicle, and
    wherein the localized direction share data comprises sudden acceleration data, satellite-based location data, and current speed data, and the map data comprises lane-level speed profile data, lane-level maneuver pattern data, and a road network graph.

2. The system of claim 1, wherein the transmitted maneuver data comprises audio-visual data, wherein the audio-visual data is renderable as augmented reality and voice alerts, wherein the mobile device is a handheld or onboard mobile device.

3. The system of claim 1, wherein to determine the localized direction share data, the one or more processors are further configured to execute lane-level map matching on the direction share data.

4. The system of claim 1, wherein the localized direction share data further comprises one or more of turn-signal data for lane-level direction and maneuver, or horn data.

5. The system of claim 1, wherein the maneuver data further comprises one or more of lane change data, overtaking data, recommended driving speed data, routing data, estimated time of arrival data, wrong-way direction data, or restricted driving maneuver data, and wherein the maneuver of the vehicle is changed by the at least one control signal into a lane change maneuver, an overtaking maneuver, a driving speed maneuver, a sudden acceleration or deceleration maneuver, a turn maneuver, or a combination thereof.

6. A method for generating maneuver data for a vehicle, the method comprising:
    obtaining, by one or more processors configured in a base station or a mobile device, direction share data from at least one other mobile device, wherein the direction share data comprises immediate route data and immediate direction data associated with the corresponding at least one other mobile device;
    determining, by the one or more processors, localized direction share data for the at least one other mobile device from the direction share data, wherein the localized direction share data indicates location, exact lane and direction of the corresponding at least one other mobile device;
    generating, by the one or more processors, the maneuver data for the vehicle using at least one machine learning model to run physics simulations based on the localized direction share data and map data, wherein the maneuver data comprises at least one control signal that changes a maneuver of the vehicle; and
    transmitting, over a network, the generated maneuver data to the at least one other mobile device residing on the vehicle,
    wherein the at least one machine learning model is trained, based on the map data and secondary localized direction share data, wherein the secondary localized direction share data corresponds to localization direction share data of a bench test vehicle, and
    wherein the localized direction share data comprises sudden acceleration data, satellite-based location data, and current speed data, and the map data comprises lane-level speed profile data, lane-level maneuver pattern data, and a road network graph.

7. The method of claim 6, wherein the transmitted maneuver data comprises audio-visual data, wherein the audio-visual data is renderable as augmented reality and voice alerts.

8. The method of claim 6, wherein the determining of the localized direction share data for the at least one other mobile device comprises lane-level map matching the direction share data.

9. The method of claim 6, wherein the localized direction share data further comprises one or more of turn-signal data for lane-level direction and maneuver, or horn data, GPS data, or current speed data.

10. The method of claim 6, wherein the maneuver data further comprises one or more of lane change data, overtaking data, recommended driving speed data, routing data, estimated time of arrival data, wrong-way direction data, or restricted driving maneuver data, and wherein the maneuver of the vehicle is changed by the at least one control signal into a lane change maneuver, an overtaking maneuver, a driving speed maneuver, a sudden acceleration or deceleration maneuver, a turn maneuver, or a combination thereof.

11. A computer programmable product comprising a non-transitory computer readable medium having stored thereon computer executable instruction which when executed by one or more processors, cause the one or more processors to carry out operations for generating maneuver data for a vehicle, the operations comprising:

obtaining direction share data from at least one other mobile device, wherein the direction share data comprises immediate route data and immediate direction data associated with the corresponding at least one other mobile device;

determining localized direction share data for the at least one other mobile device from the direction share data, wherein the localized direction share data indicates location, exact lane and direction of the corresponding at least one other mobile device;

generating the maneuver data for the vehicle using at least one machine learning model to run physics simulations based on the localized direction share data and map data, wherein the maneuver data comprises at least one control signal that changes a maneuver of the vehicle; and transmitting, over a network, the generated maneuver data to the at least one other mobile device residing on the vehicle, wherein the at least one machine learning model is trained, based on the map data and secondary localized direction share data, wherein the secondary localized direction share data corresponds to localization direction share data of a bench test vehicle, and wherein the localized direction share data comprises sudden acceleration data, satellite-based location data, and current speed data, and the map data comprises lane-level speed profile data, lane-level maneuver pattern data, and a road network graph.

12. The computer programmable product of claim 11, wherein the localized direction share data further comprises one or more of turn-signal data for lane-level direction and maneuver, or horn data, GPS data.

13. The computer programmable product of claim 11, wherein the maneuver data further comprises one or more of lane change data, overtaking data, recommended driving speed data, routing data, estimated time of arrival data, wrong-way direction data, or restricted driving maneuver data, and wherein the maneuver of the vehicle is changed by the at least one control signal into a lane change maneuver, an overtaking maneuver, a driving speed maneuver, a sudden acceleration or deceleration maneuver, a turn maneuver, or a combination thereof.

* * * * *